United States Patent
Ehrhardt et al.

(10) Patent No.: US 7,294,325 B2
(45) Date of Patent: Nov. 13, 2007

(54) METHOD FOR THE PRODUCTION OF HYDROCYANIC ACID BY OXIDATION OF NITROGEN-CONTAINING HYDROCARBONS IN A FLAME

(75) Inventors: Kai Rainer Ehrhardt, Ludwigshafen (DE); Mayke Mueller-Eversbusch, Mannheim (DE); Dieter Stapf, Brasschaat (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 219 days.

(21) Appl. No.: 10/517,814

(22) PCT Filed: Jul. 24, 2003

(86) PCT No.: PCT/EP03/08128

§ 371 (c)(1),
(2), (4) Date: Dec. 14, 2004

(87) PCT Pub. No.: WO2004/011373

PCT Pub. Date: Feb. 5, 2004

(65) Prior Publication Data

US 2005/0220693 A1    Oct. 6, 2005

(30) Foreign Application Priority Data

Jul. 25, 2002  (DE)  ................................ 102 33 931

(51) Int. Cl.
*C01C 3/02* (2006.01)
*C01C 3/04* (2006.01)
(52) U.S. Cl. ........................ 423/372; 423/238; 423/375
(58) Field of Classification Search ................ 423/372, 423/375
See application file for complete search history.

(56) References Cited

U.S. PATENT DOCUMENTS 2,596,421 A    5/1952    Mckinnis (Continued)

FOREIGN PATENT DOCUMENTS

DE    1 159 409    12/1963

(Continued)

OTHER PUBLICATIONS

Morikawa, Tokio. "Evolution of Hydrogen Cyanide during Combustion and Pyrolysis", Journal of Combustion Toxicology, vol. 5, pp. 315-330, XP002069700 1978, no month.
Schingnitz, Manfred et al. "Flugstromvergasung", Umwelt, vol. 29, No. 9 1999, no month.

*Primary Examiner*—Wayne A. Langel
(74) *Attorney, Agent, or Firm*—Oblon, Spivak, McClelland, Maier & Neustadt, P.C.

(57) ABSTRACT

A process is described for preparing hydrogen cyanide by autothermal noncatalytic oxidation of one or more nitrogenous hydrocarbons or a nitrogenous hydrocarbon mixture in which the nitrogenous hydrocarbons, an oxygen-containing gas, with or without ammonia, with or without water, with or without a gas containing nitrogen oxides and with or without other essentially inert feed gas constituents are introduced into a flame reaction zone, react in the flame reaction zone and a post-reaction zone at a temperature of from 1000 to 1800° C. for a reaction time of 0.03 to 0.3 s to form a cleavage gas which comprises at least the constituents hydrogen cyanide, carbon oxides, hydrogen, water, ammonia, nitrogen, light hydrocarbons with or without other cleavage gas constituents, the atomic C/N ratio in the reaction zones being from 1 to 7 and the atomic air ratio $\lambda_{ato}$ being <0.6, the cleavage gas being cooled and separated.

17 Claims, 3 Drawing Sheets

U.S. PATENT DOCUMENTS

| | | | |
|---|---|---|---|
| 3,371,990 A * | 3/1968 | Krebaum | 423/372 |
| 3,661,494 A * | 5/1972 | Fetting et al. | 431/4 |
| 4,136,156 A * | 1/1979 | Weigert | 423/372 |
| 4,981,670 A | 1/1991 | Dio et al. | |
| 5,204,079 A | 4/1993 | Suresh et al. | |
| 6,042,799 A * | 3/2000 | Halbritter et al. | 423/372 |
| 6,221,327 B1 * | 4/2001 | DeCourcy et al. | 423/376 |

FOREIGN PATENT DOCUMENTS

| | | |
|---|---|---|
| DE | 198 05 481 | 8/1999 |
| EP | 0 941 965 | 9/1999 |
| EP | 1 099 747 | 5/2001 |
| IT | 845 992 | 7/1969 |

\* cited by examiner

METHOD FOR THE PRODUCTION OF HYDROCYANIC ACID BY OXIDATION OF NITROGEN-CONTAINING HYDROCARBONS IN A FLAME

CROSS REFERENCES TO RELATED APPLICATIONS

This application is a national stage application of International Patent Application No. PCT/EP03/08128, filed on Jul. 24, 2003, and claims priority to German Patent Application No. 102 33 931.7, filed on Jul. 25, 2002, both of which are incorporated herein by reference in their entireties.

The invention relates to a process for preparing hydrogen cyanide by autothermal noncatalytic oxidation of nitrogenous hydrocarbons in a flame.

In the preparation of nitrogenous base chemicals such as acrylonitrile, adiponitrile or isocyanates, nitrogenous byproducts are sometimes produced which cannot be further utilized materially since, for example, their isolation would be too complex or there is no economically efficient possibility for their direct material use. Such byproducts are frequently produced as distillation residues, in the form of complex mixtures. Such residues have been disposed of to date, for example, by combusting them, or by converting them in gasification processes completely into combustible gas which is then thermally utilized, for example in gas engines or gas turbines for generating electrical power and heating energy.

M. Schingnitz and J. Görz describe in Umwelt, Volume 29 (1999), No. 9, the gasification of fuels, residues and wastes by entrained-flow gasification.

It is known to generate hydrogen cyanide in a flame by combustion of mixtures of low aliphatic hydrocarbons, ammonia and oxygen. In addition, it is known to oxidize catalytically acetonitrile as a light nitrogenous hydrocarbon, hydrogen cyanide being obtained.

U.S. Pat. No. 2,596,421 discloses the flame synthesis of hydrogen cyanide from ammonia, oxygen and light hydrocarbons having a maximum of 6 carbon atoms. Three different laminar burners are proposed to carry out the flame synthesis.

DE-B 1 159 409 describes the preparation of hydrogen cyanide by noncatalytic autothermal combustion of saturated or unsaturated hydrocarbons having from 1 to 6 carbon atoms, ammonia and oxygen, and cooling the reacted gases immediately after exit from the combustion zone. The combustion takes place in a turbulent flame.

U.S. Pat. No. 4,981,670 describes the preparation of hydrogen cyanide by catalytic oxidation of acetonitrile on an oxidation/amoxidation catalyst in a fluidized-bed reactor.

It is an object of the present invention to provide a process for the material utilization of residues which comprise organically bound nitrogen.

We have found that this object is achieved by a process for preparing hydrogen cyanide by autothermal noncatalytic oxidation of one or more nitrogenous hydrocarbons or a nitrogenous hydrocarbon mixture in which the nitrogenous hydrocarbons, an oxygen-containing gas, with or without ammonia, with or without water, with or without a gas containing nitrogen oxides and with or without other essentially inert feed gas constituents are introduced into a flame reaction zone, react in the flame reaction zone and a post-reaction zone at a temperature of from 1000 to 1800° C. for a reaction time of 0.03 to 0.3 s to form a cleavage gas which comprises at least the constituents hydrogen cyanide, carbon oxides, hydrogen, water, ammonia, nitrogen, light hydrocarbons with or without other cleavage gas constituents, the atomic C/N ratio in the reaction zones being from 1 to 7 and the atomic air ratio $\lambda_{ato}$ being <0.6, the cleavage gas being cooled and separated.

The flame reaction zone is the reaction zone in which typically approximately 95% fuel or oxidizer are reacted. The flame reaction zone is distinguished by light emissions in the visible range and is optically detectable as such. It is followed according to the invention by a post-reaction zone.

The autothermal noncatalytic oxidation of the nitrogenous hydrocarbons can be carried out in the presence or absence of ammonia additionally introduced into the flame. By adding ammonia, a defined C/N ratio can be set in the reaction mixture.

In order to achieve a satisfactory HCN yield, the atomic C/N ratio in the flame should be from 1 to 7. If the atomic C/N ratio in the nitrogenous hydrocarbon or hydrocarbons used is >7, adding ammonia is generally necessary in order to decrease the C/N ratio to a value less than or equal to 7. If the atomic C/N ratio of the nitrogenous hydrocarbons used is in the range from 5 to 7, preferably ammonia is added in order to decrease the C/N ratio further. If the atomic C/N ratio of the nitrogenous hydrocarbons used is in the range from 1 to 5, good HCN yields can be achieved without adding ammonia. Particularly preferably, the atomic C/N ratio is in the range from 2 to 4, since then a high hydrogen cyanide yield is achieved with respect to the bound nitrogen and carbon in the fuel mixture and a high hydrogen cyanide concentration in the cleavage gas is achieved.

The atomic C/N ratio is the ratio of the total bound carbon in the feed hydrocarbons to the total bound nitrogen in the feed hydrocarbons and where appropriate in the added ammonia and the added nitrogen oxides (NO, $NO_2$; $N_2O$ is not taken into account) without taking into account the molecular nitrogen introduced with the oxygen-containing gas, for example air. The carbon which is directly bound to oxygen, as in methanol or formaldehyde, is not taken into account in the total carbon for calculating the C/N ratio. Accordingly, in the case of ethanol, only the methyl carbon is taken into account.

Suitable nitrogenous feed hydrocarbons can be certain well-defined compounds such as acetonitrile, propionitrile, adiponitrile or methylglutaronitrile. Suitable nitrogenous feed hydrocarbons, however, can also be complex nitrogenous hydrocarbon mixtures. Such hydrocarbon mixtures are produced, for example, in the preparation of defined nitrogenous compounds as residues, for example distillation residues. Examples are nitrogenous residues produced in the preparation of adipodinitrile, acrylonitrile, aniline or isocyanates. Further examples are refinery residues. The inventive process is suitable in particular for supplying such residues to an economic material utilization.

In principle the inventive process is also suitable for material utilization of nitrogen-free hydrocarbons or hydrocarbon mixtures which are produced as residues. Such hydrocarbons are preferably low-oxygen hydrocarbons, for example contaminated solvents such as THF or hexane.

The oxygen-containing gas which is introduced into the flame and maintains the combustion can be, for example, pure oxygen, oxygen-enriched air or air. Preferably, the oxygen-containing gas is technical-grade oxygen. By using virtually pure oxygen, a hydrogen cyanide concentration as high as possible in the cleavage gas is achieved, since large amounts of inert gases, such as molecular nitrogen, do not need to be introduced into the gas mixture. This facilitates the workup of the cleavage gas and improves the thermal utilizability of the residual cleavage gas remaining after the removal of hydrogen cyanide.

For the hydrogen cyanide yield of the inventive process it is essential that the atomic air ratio $\lambda_{ato}$ is <0.6. In addition, it is essential for the hydrogen cyanide yield that the temperature in the flame is in the range from 1000 to 1800° C. It has been found that chemically bound nitrogen in the rich combustion mixtures, that is to say low-oxygen combustion mixtures, and at high temperatures principally reacts to form hydrogen cyanide. A temperature in the specified range and an atomic air ratio $\lambda_{ato}$<0.6 lead, in addition, to light hydrocarbons such as methane, ethylene and acetylene being present in the product gas mixture exiting the flame reaction zone. The presence of these hydrocarbons in the post-reaction zone counteracts the hydrogen cyanide breakdown in the post-reaction zone.

The atomic air ratio is defined as follows:

$$\lambda_{ato}=[O]/([H]/2+2\times[C])$$

In the equation [O], [H] and [C] denote the total free or bound oxygen, hydrogen and carbon present in total in the combustion mixture.

The temperature in the flame can be controlled via the oxygen feed. Increasing the feed of molecular oxygen also causes an increase in flame temperature. The flame temperature can, in addition, be controlled by adding water. Adding water firstly causes cooling, but secondly also increases the oxygen supply in the flame and thus the atomic air ratio. This counteracts unwanted soot formation.

In an embodiment of the inventive process, water is introduced into the flame. Water can be introduced into the flame in the vapor state or in liquid form, for example as hydrocarbon/water emulsion. A particularly good cooling is achieved, because of the high evaporation enthalpy of water, when water is introduced in liquid form into the flame.

The temperature in the flame can also be controlled by adding gases which substantially behave in an inert manner in the flame, which act as thermal ballast and thus cause cooling.

In a further embodiment of the inventive process, substantially inert-behaving further feed gas constituents are introduced into the flame. Such feed gas substituents are, for example, carbon oxides (CO and $CO_2$), molecular hydrogen or oxygen. Essentially, inert-behaving feed gas constituents are those which behave substantially inertly with respect to hydrogen cyanide formation, that is do not participate in the reactions leading to hydrogen cyanide formation.

The temperature in the flame is preferably from 1200 to 1400° C.

In addition to said gases, gases containing nitrogen oxides, that is to say nitrogen monoxide or nitrogen dioxide, can be introduced into the flame. Nitrogen oxides are also converted into hydrogen cyanide with high yield in the inventive process. Thus the inventive process also permits the material utilization of exhaust gases containing nitrogen oxides, for example from nitric acid preparation.

In addition, it is essential for the hydrogen cyanide yield of the inventive process that the residence time of the reaction gas mixture is in the range from 0.03 to 0.3 s at the combustion temperature of from 1000 to 1800° C. It has been found that a longer residence time and/or higher temperatures leads to a significant breakdown of previously formed hydrogen cyanide. With a shorter residence time and/or lower temperatures, the conversion rate achieved, in contrast, is inadequate. Both act in a manner to decrease the yield. A defined residence time in said temperature range can be set by rapid cooling of the cleavage gas formed in the combustion.

The nitrogenous feed hydrocarbon or hydrocarbons can be introduced in liquid form or in the gaseous state into the flame.

The feed hydrocarbons can be introduced in liquid form into the flame. The hydrocarbons are preferably introduced in liquid form by atomizing the hydrocarbons to fine liquid droplets, preferably having a mean droplet diameter of <100 μm, particularly preferably <50 μm, in particular <20 μm. For the purposes of the present invention, mean droplet diameter is the Sauter diameter $d_{32}$ known to those skilled in the art, which characterizes the specific surface area per unit volume. A droplet size as small as possible ensures that the time which the liquid droplets require for complete vaporization is small compared with the reaction time, so that the vaporization takes place quasi-instantaneously. Typically, a 200 μm hydrocarbon droplet requires approximately 50 ms for complete vaporization, which is already in the order of magnitude of the reaction time. The first vaporized hydrocarbon molecules therefore find, even in the time mean of rich combustion conditions, a high oxygen supply, that is to say lean combustion conditions. However, lean combustion conditions decrease the hydrogen cyanide yield. Large hydrocarbon droplets can even break through the flame.

The feed hydrocarbons can be atomized by means of a single-component nozzle or, using an auxiliary atomizing medium, by means of a two-component nozzle. Very fine atomization is frequently achieved using an auxiliary atomizing medium. As auxiliary atomizing medium, the oxygen-containing gas used and/or other gas constituents of the reaction gas mixture to be introduced into the flame, such as ammonia, or steam, can be used.

It is also possible, provided that the additional feed of water, for example for controlling the flame temperature and/or for increasing the oxygen supply, is provided, to introduce the nitrogenous hydrocarbon as an aqueous emulsion into the flame. Owing to the presence of water, the re-atomization of the liquid droplets in the flame takes place. This is caused by spontaneous vaporization of emulsified water droplets. This makes very fine atomization possible.

The nitrogenous feed hydrocarbon or hydrocarbons can be introduced in the gaseous state into the flame. The nitrogenous hydrocarbons can be vaporized in advance, then premixed with further feed gas constituents and introduced as gas mixture into the flame. Further feed gas constituents with which the pre-vaporized hydrocarbons are mixed are, in particular, the oxygen-containing gas with or without ammonia, but also steam and other inert-behaving gas constituents such as molecular hydrogen and carbon oxides. The feed hydrocarbon or feed hydrocarbons can also be only partly pre-vaporized and/or premixed with only a part of the further feed gas constituents.

Preference is given to a burner construction which achieves flow as free from back-mixing as possible, since backmixing decreases the hydrogen cyanide yield. Generally, in the flame reaction zone and the post-reaction zone, turbulent flow prevails.

A cleavage gas is obtained which comprises at least the constituents hydrogen cyanide, carbon oxides, hydrogen, water, ammonia, nitrogen and light hydrocarbons. Furthermore, the cleavage gas can comprise further constituents such as nitrogen monoxide or isocyanic acid.

A typical cleavage gas composition comprises, as main constituents, hydrogen cyanide, ammonia, nitrogen, steam, carbon monoxide, carbon dioxide and hydrogen and, as minor components, methane, ethylene and acetylene and, in traces, nitrogen monoxide and isocyanic acid.

Separation of a cleavage gas which comprises at least the constituents hydrogen cyanide, carbon oxides, hydrogen, water and ammonia, preferably comprises the steps
(i) cooling the cleavage gas to a temperature<300° C.;
(ii) removing ammonia as ammonium sulfate or ammonium phosphate by gas scrubbing, with an ammonia-depleted cleavage gas being obtained;
(iii) removing hydrogen cyanide as aqueous hydrogen cyanide solution, a hydrogen cyanide-depleted residual cleavage gas being obtained;
(iv) recovering hydrogen cyanide from the aqueous hydrogen cyanide solution by distillation;
(v) where appropriate, partially recirculating the residual cleavage gas to the flame reaction zone.

The cleavage gas can be cooled in a plurality of stages. For example, in a first stage, by spraying water into the hot cleavage gas, a very rapid cooling to approximately 800° C. can take place. In a second stage, the hot cleavage gas can be cooled in a steam generator to approximately 300° C. In a third stage, the cleavage gas can be cooled to approximately 200° C. by spraying in oil. In this process, soot and soot precursors (polycyclic hydrocarbons) formed during the combustion are suspended or dissolved in the oil and are thus scrubbed out of the cleavage gas.

Ammonia can be removed by gas scrubbing using sulfuric acid, phosphoric acid or monoammonium phosphate solution, with ammonia being removed as ammonium sulfate or ammonium phosphate. In this process an ammonia-depleted cleavage gas is obtained; preferably an ammonia-free cleavage gas is obtained. If ammonia is removed as ammonium phosphate, ammonia can be stripped free from the aqueous solution using steam and recycled to the flame. The recovered ammonium monophosphate solution can be recirculated to the gas scrubber.

Hydrogen cyanide can be removed by condensing hydrogen cyanide and steam from the cleavage gas or by absorption in cold water, an aqueous hydrogen cyanide solution being obtained. Essentially anhydrous hydrogen cyanide can be recovered from the aqueous hydrogen cyanide solution by distillation.

A hydrogen cyanide-depleted residual cleavage gas, preferably an essentially hydrogen cyanide-free residual cleavage gas, remains which, for example, still comprises carbon oxides and molecular hydrogen and, in small amounts, minor constituents such as methane, ethylene and acetylene. The residual cleavage gas can be at least partially recirculated into the flame as thermal ballast. The residual cleavage gas can, in addition, be thermally utilized.

BRIEF DESCRIPTION OF THE DRAWINGS

FIG. 2b shows a plan view of the burner together with the orifices 32a to 38a.

The invention will be described in more detail below with reference to the drawings.

Figure 1:
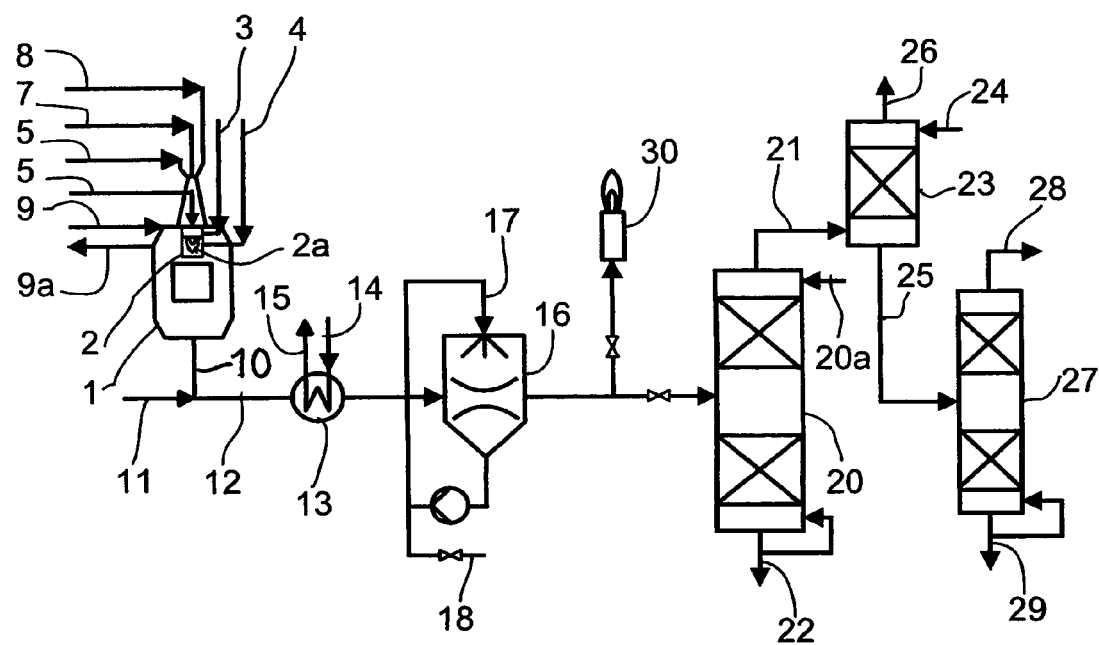
FIG. 1 shows a process diagram of a preferred embodiment of the inventive process.

FIG. 1 shows a process diagram of a preferred embodiment of the inventive process. The reactor designated overall by 1 comprises a burner 2 having a burner flame 2a and feed lines 3 to 8. Via feedlines 3 and 4, natural gas and air are introduced to operate a pilot burner and to heat the reactor. Via feedlines 5, 6, 7 and 8, nitrogenous liquid residue, oxygen, ammonia and steam are introduced. Via feedline 9 and the outlet line 9a, the reactor is supplied with cooling water. The resultant hot cleavage gases 10 are rapidly cooled to approximately 800° C. by spraying in water 11 into the hot cleavage gas in a line 12 having an expanded pipe cross-section. The cleavage gas thus precooled is passed to a steam generator 13 having a water feedline 14 and steam outlet line 15 and is there cooled to approximately 300° C. In the Venturi scrubber 16, the cleavage gas is finally cooled to approximately 200° C. by spraying in quenching oil 17, with soot-containing oil 18 being produced. To remove ammonia, the cooled cleavage gas 19 is scrubbed in a separation column 20 using sulfuric acid, phosphoric acid or monoammonium phosphate solution 20a, with ammonia being removed as ammonium sulfate or ammonium phosphate. At the top of the column an ammonia-free cleavage gas 21 is obtained, and at the bottom of the column an aqueous solution 22 of ammonium phosphate or ammonium sulfate is obtained. To remove hydrogen cyanide, the ammonia-free cleavage gas 21 is passed to a further separation column 23 in which hydrogen cyanide is absorbed from the cleavage gas in cold water 24. At the bottom of the column an aqueous hydrogen cyanide solution 25 is obtained, at the top of the column an essentially hydrogen cyanide-free residual cleavage gas 26 is obtained which can be used, for example, as synthesis gas. The aqueous hydrogen cyanide solution 25 is passed to a further separation column 27 and there separated into essentially anhydrous hydrogen cyanide 28 as overhead product and water 29 as bottom product. For emergencies, and for startup and shutdown operations, in addition, a conventional flare 30 is provided.

A hydrogen cyanide-depleted residual cleavage gas 26, preferably an essentially hydrogen cyanide-free residual cleavage gas 26, remains, which still comprises, for example, carbon oxides and molecular hydrogen and, in small amounts, minor components such as methane, ethylene and acetylene. The residual cleavage gas can be at least in part recirculated into the flame as thermal ballast. The residual cleavage gas can, in addition, be thermally utilized.

Figure 2A:
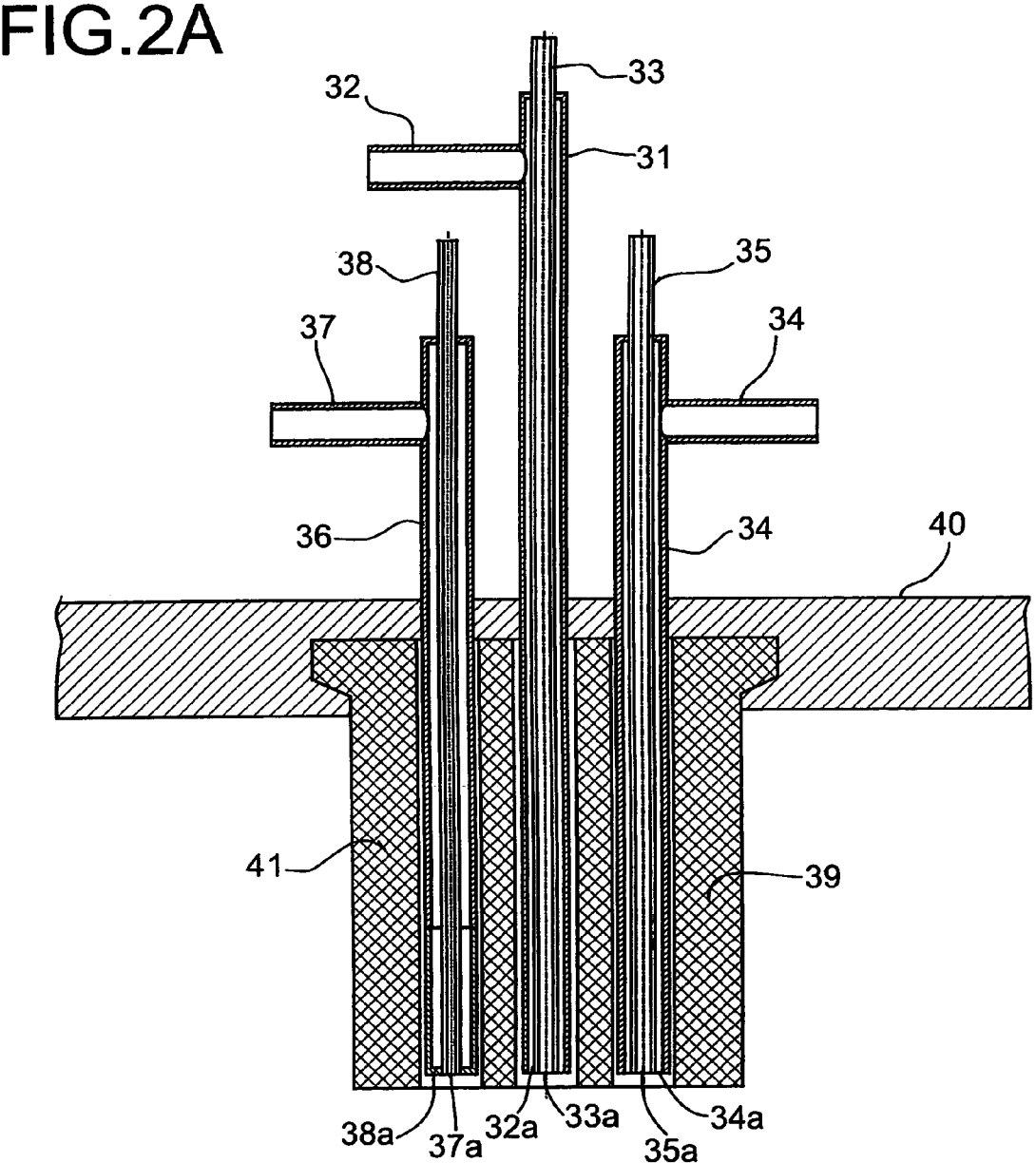
FIG. 2a shows a section through a burner used in the inventive process for generating a flame reaction zone.

FIG. 2a shows a section through a burner used in the inventive process for generating a flame reaction zone. The burner, which is designated overall 39, and is anchored in a combustion chamber lid 40, comprises, incorporated into a burner brick 41, a pilot burner 31 having an air feedline 32 and a natural gas feedline 33 having corresponding orifices 32a and 33a, respectively, a multiplicity of gas feedlines 34 for inert gases and gas feedlines 35 for ammonia concentrically arranged in these having corresponding orifices 34a and 35a, respectively, and a multiplicity of two-component nozzles 36 having feedlines 37 for oxygen and feedlines 38 for nitrogenous liquid residues concentrically arranged in these having corresponding orifices 37a and annular gap orifices 38a, respectively.

Figure 2B:
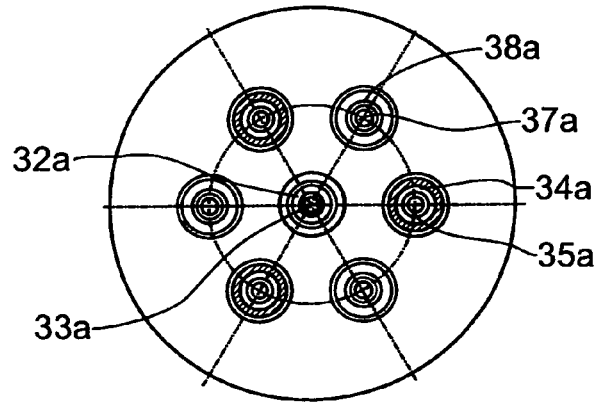

FIG. 2b shows a plan view of the burner together with the orifices 32a to 38a.

Figure 3:
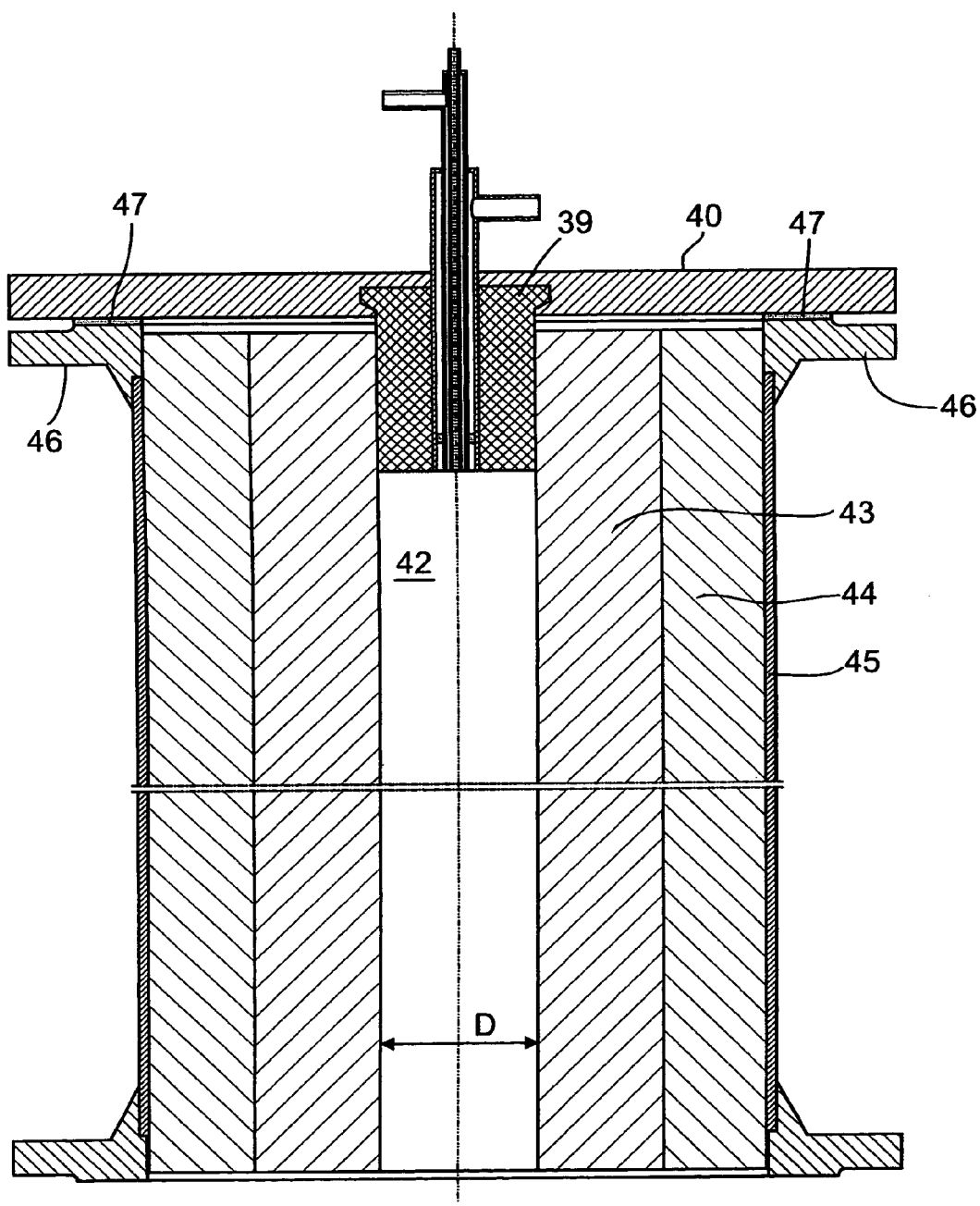
FIG. 3 shows a section through a reactor used in the inventive process.

FIG. 3 shows a section through a reactor used in the inventive process. Connected to the burner 39 which is incorporated into the burner lid 40 (shown simplified) is the cylindrical combustion chamber 42 of diameter D and length L, which is bound by the high-temperature insulation 43 (for example of $Al_2O_3$ and $SiO_2$). The high-temperature insulation 43 is surrounded by the rear insulation 44 and the steel shell 45. This is connected via a flange 46 and seals 47 to the burner lid 40. The geometry of the combustion chamber achieves a low-backmixing plug flow.

EXAMPLE

In a laboratory system, a study is made of the autothermal noncatalytic partial oxidation of acetonitrile which serves as simple model substance for highly nitrogeneous hydrocarbons. The laboratory system comprises a burner having an outer diameter of 15 mm which has six axial 4 mm boreholes for feeding in the premixed starting materials and a central 2 mm borehole for feeding in oxygen. A 1.1 m long tube made of aluminum oxide having an internal diameter of 15 mm is mounted on the burner, which tube is situated in an electrically heated furnace. The furnace temperature is selected to be equal to the calculated reaction temperature of 1300° C., to minimize heat losses. 1.93 kg/h of acetonitrile and 0.19 kg/h of water are metered in two separate thin-film evaporators and vaporized. The vapors are homogeneously mixed with 0.12 m³ (S.T.P.)/h of oxygen and fed through the six axial boreholes at 120° C. Through the central borehole is fed 0.12 m³ (S.T.P.)/h of oxygen to stabilize the flame. The residence time of the reaction gases at the reaction temperature of 1300° C. is calculated to be 0.05 s. The cleavage gas formed is then rapidly cooled to about 150° C. by water-cooled walls and the gas composition is thus "frozen". The cooler has a 90° bend having an internal diameter of 29.7 mm, to which is attached a 485 mm long straight piece having an internal diameter of 20 mm. The cooled length between the end of the reactor and the sampling point is in total 670 mm. The composition of the cleavage gas mixture is then determined. HCN and $NH_3$ are determined using an FT-IR spectrometer, in which case for determining HCN, the cleavage gas is dried in advance over $P_2O_5$, whereas $NH_3$ is determined in the gas mixture which contains water vapor. CO, $CO_2$ and $CH_4$ are determined by ND-IR, $CH_4$, $C_2H_2$, $C_2H_4$ and $C_2H_6$ are determined by GC-FID and $H_2$ is determined using a thermal conductivity detector, where HCN, $NH_3$ and $H_2O$ being removed in advance by NaOH or $P_2O_5$.

The composition below was determined (in % by volume, based on the anhydrous gas mixture):

| | |
|---|---|
| HCN | 29 |
| $NH_3$ | 1.8 |
| CO | 28 |
| $CO_2$ | 1.4 |
| $H_2$ | 26 |
| $CH_4$ | 1.8 |
| $C_2H_2$ | 2 |
| $C_2H_4$ | 0.1 |
| $C_2H_6$ | 0.001 |

This gives an HCN yield of approximately 70%, based on nitrogen used.

We claim:

1. A process for preparing hydrogen cyanide by autothermal noncatalytic oxidation of one or more nitrogenous hydrocarbons or a nitrogenous hydrocarbon mixture wherein said nitrogenous hydrocarbons, an oxygen-containing gas, with or without ammonia, with or without water, with or without a gas comprising nitrogen oxides and with or without other essentially inert feed gas constituents are introduced into a flame reaction zone, react in the flame reaction zone and a post-reaction zone at a temperature of from 1000 to 1800° C. for a reaction time of 0.03 to 0.3 s to form a cleavage gas which comprises hydrogen cyanide, carbon oxides, hydrogen, water, ammonia, nitrogen, light hydrocarbons with or without other cleavage gas constituents, the atomic C/N ratio in the reaction zones being from 1 to 7 and the atomic air ratio $\lambda_{ato}$ being <0.6, said cleavage gas being cooled and separated.

2. A process as claimed in claim 1, wherein said ammonia is introduced into said flame reaction zone.

3. A process as claimed in claim 1, wherein said nitrogenous hydrocarbons have a C/N ratio of from 1 to 5.

4. A process as claimed in claim 1, wherein the said nitrogenous hydrocarbons have a C/N ratio of from 5 to 7.

5. A process as claimed in claim 1, wherein said nitrogenous hydrocarbons are one or more residues.

6. A process as claimed in claim 1, wherein water is introduced into said flame reaction zone.

7. A process as claimed in claim 1, wherein one or more additional essentially inert behaving feed gas constituents are introduced into said flame reaction zone.

8. A process as claimed in claim 7, wherein said essentially inert-behaving feed gas constituents comprise carbon oxides and/or hydrogen obtained from said cleavage gas.

9. A process as claimed in claim 1, wherein said gas comprising nitrogen oxide is introduced into said flame reaction zone.

10. A process as claimed in claim 1, wherein said nitrogenous hydrocarbons or said hydrocarbon mixture are/is introduced in liquid form into said flame reaction zone.

11. A process as claimed in claim 10, wherein said nitrogenous hydrocarbons are atomized to form liquid droplets having a mean particle diameter of <100 μm.

12. A process as claimed in claim 10, wherein said nitrogenous hydrocarbons or said hydrocarbon mixture is/are introduced as an aqueous emulsion into said flame reaction zone.

13. A process as claimed in claim 12, wherein said aqueous emulsion is atomized to form liquid droplets having a particle diameter of <100 μm.

14. A process as claimed in claim 1, wherein said nitrogenous hydrocarbons are introduced in the gaseous state into said flame reaction zone.

15. A process as claimed in claim 14, wherein said gaseous nitrogenous hydrocarbons are premixed with at least a part of the feed gas constituents selected from the group consisting of f said oxygen-containing gas, said ammonia, said gas comprising nitrogen oxide, said water and said essentially inert-behaving feed gas constituents, and the resultant gas mixture is introduced into said flame reaction zone.

16. A process as claimed in one of claim 1, wherein turbulent flow prevails in said reaction zones.

17. A process as claimed in claim 1, wherein the separation of said cleavage gas comprises:
 (i) cooling said cleavage gas to a temperature <300° C.;
 (ii) removing said ammonia as ammonium sulfate or ammonium phosphate by gas scrubbing to obtain an ammonia-depleted cleavage gas;
 (iii) removing said hydrogen cyanide as aqueous hydrogen cyanide solution to obtain a hydrogen cyanide-depleted and ammonia-depleted residual cleavage gas;
 (iv) recovering hydrogen cyanide from said aqueous hydrogen cyanide solution by distillation; and
 (v) optionally, partially recirculating said residual cleavage gas to said flame reaction zone.

* * * * *